US006947828B2

United States Patent
Fujiwara et al.

(10) Patent No.: US 6,947,828 B2
(45) Date of Patent: Sep. 20, 2005

(54) KNOCK CONTROL SYSTEM FOR INTERNAL COMBUSTION ENGINE

(75) Inventors: Mikio Fujiwara, Wako (JP); Yasuaki Asaki, Wako (JP); Jiro Takagi, Wako (JP); Hirosuke Niwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/768,651

(22) Filed: Feb. 2, 2004

(65) Prior Publication Data

US 2004/0158388 A1 Aug. 12, 2004

(30) Foreign Application Priority Data

Feb. 10, 2003 (JP) ........................................ 2003-032769

(51) Int. Cl.[7] .............................................. G06G 7/70
(52) U.S. Cl. ............. 701/111; 123/406.29; 123/406.34; 123/406.36
(58) Field of Search ...................... 701/111; 123/406.35, 123/406.29, 406.34, 406.37, 406.39

(56) References Cited

U.S. PATENT DOCUMENTS 5,140,962 A * 8/1992 Iwata .................... 123/406.35
5,481,461 A * 1/1996 Miyamoto et al. ............. 701/99
6,279,536 B1 * 8/2001 Brielbeck et al. ...... 123/406.35
6,456,927 B1 * 9/2002 Frankowski et al. ........ 701/111

FOREIGN PATENT DOCUMENTS

JP          2844418          10/1998

* cited by examiner

Primary Examiner—Tony M. Argenbright
Assistant Examiner—Johnny H. Hoang
(74) Attorney, Agent, or Firm—Arent Fox PLLC

(57) ABSTRACT

A knock control system for an internal combustion engine having a plurality of cylinders. Operation of the engine is switchable between a partial-cylinder operation for operating some of the cylinders and an all-cylinder operation for operating all of the cylinders. A determination threshold for determining knocking is set according to an output signal from the knock sensor. A level of the output signal from the knock sensor is compared with the determination threshold, and occurrence of knocking is determined according to a result of the comparison. The determination threshold used during the partial-cylinder operation is set to a value less than a value of the determination threshold used during the all-cylinder operation.

15 Claims, 17 Drawing Sheets

KNOCK CONTROL SYSTEM FOR INTERNAL COMBUSTION ENGINE

BACKGROUND OF THE INVENTION

1. Field of the Invention

The present invention relates to a knock control system for an internal combustion engine, and more particularly to a knock control system for an internal combustion engine having a plurality of cylinders wherein operation of the engine is switchable between a partial-cylinder operation for operating some of the cylinders and an all-cylinder operation for operating all of the cylinders.

2. Description of the Related Art

A conventional method of determining knocking according to an output signal from a knock sensor mounted on an internal combustion engine for detecting high-frequency vibrations is well-known in the art. For example, Japanese Patent No. 2844418 discloses a determination method, which is discussed below.

In a condition where knocking does not occur, a noise level VNOISE is detected by the knock sensor, and the detected noise level is multiplied by a determination gain GAMP, which is set according to an engine operating condition, to calculate a knocking determination threshold. When the level of a signal indicating an output from the knock sensor exceeds the knocking determination threshold, it is determined that knocking has occurred.

However, if the above-discussed conventional method is used to determine if knocking is occurring in an internal combustion engine having a plurality of cylinders, wherein operation of the engine is switchable between a partial-cylinder operation for operating some of the cylinders and an all-cylinder operation for operating all of the cylinders, the following problems may arise.

For example, it is known that the level of a signal output from the knock sensor tends to become greater during the all-cylinder operation than during the partial-cylinder operation. Accordingly, if the knocking determination threshold is set according to the noise level detected during the all-cylinder operation, the knocking determination threshold is too high to be reliable or effective during the partial-cylinder operation. In other words, it is commonly known that although knocking has occurred, the knocking is not detected during the partial-cylinder operation because the knocking determination threshold has been set too high. Conversely, if the knocking determination threshold is set according to the noise level detected during the partial-cylinder operation, the knocking determination threshold is too low to be reliable or effective during the all-cylinder operation. In other words, even though knocking has not occurred, the conventional method erroneously determines knocking has occurred because the knocking determination threshold is set too low.

SUMMARY OF THE INVENTION

According to an aspect of the present invention, a knock control system is provided which accurately determines the knocking occurring in an internal combustion engine, whose operation is switchable between partial-cylinder operation and all-cylinder operation, and performs appropriate knocking suppression control according to the result of the determination that knocking is occurring.

The present invention provides a knock control system for an internal combustion engine having a plurality of cylinders. Operation of the engine is switchable between a partial-cylinder operation for operating some of the cylinders and an all-cylinder operation for operating all of the cylinders. The knock control system includes a knock sensor mounted on the engine, determination threshold setting means, knocking determination means, and control means. The determination threshold setting means sets a determination threshold for determining knocking according to an output from the knock sensor. The knocking determination means compares a level of an output signal from the knock sensor with the determination threshold and determines whether knocking has occurred based on a result of the comparison. The control means controls at least one operating parameter of the engine according to a result determined by the knocking determination means. The determination threshold setting means sets the determination threshold used during partial-cylinder operation to a value which is less than a value of the determination threshold used during all-cylinder operation.

Accordingly, the determination threshold for determining knocking is set according to an output from the knock sensor, and the level of a signal output by the knock sensor is compared with the determination threshold. The determination of knocking is performed according to the result of the comparison, and the operating parameters of the engine are controlled according to the result of the knocking determination. The determination threshold for partial-cylinder operation is set to a value smaller than the determination threshold for all-cylinder operation. As such, accurate knocking determination is performed during partial-cylinder and all-cylinder operation, resulting in accurate and proper knocking suppression control.

Preferably, the determination threshold setting means calculates the determination threshold by multiplying a noise level detected during a noise gate period with a gain coefficient.

Preferably, the gain coefficient is set according to a rotational speed of the engine, a load on the engine, and a number of operating cylinders.

Preferably, the gain coefficient is corrected according to an estimated octane of the fuel being used.

Preferably, the gain coefficient is corrected according to an engine temperature parameter indicative of a temperature of the engine.

DETAILED DESCRIPTION OF THE PREFERRED EMBODIMENTS

The preferred embodiments of the present invention will now be described with reference to the drawings.

Figure 1:
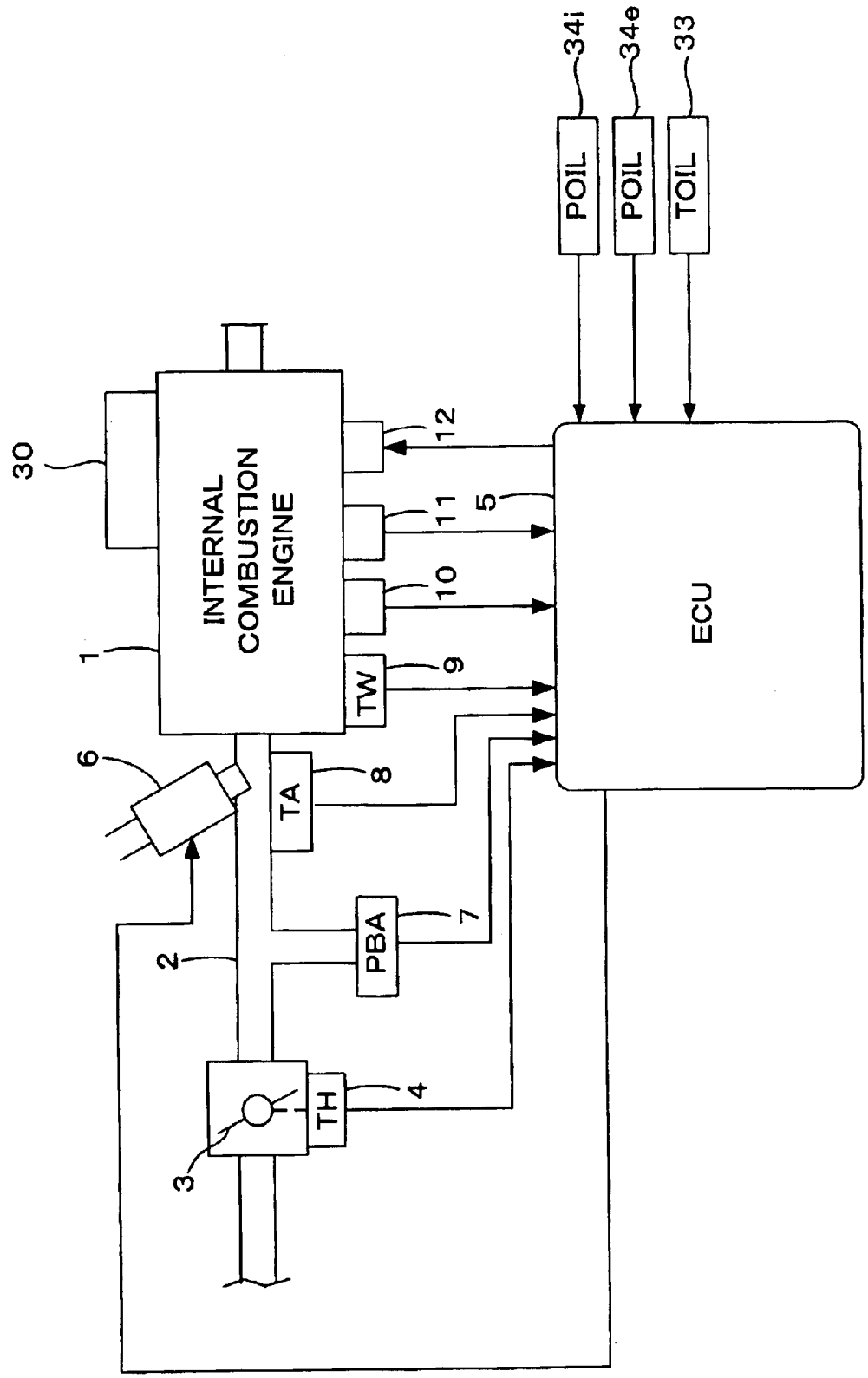
FIG. 1 is a schematic diagram of an internal combustion engine and a corresponding control system according to a first embodiment of the present invention.
Figure 2:
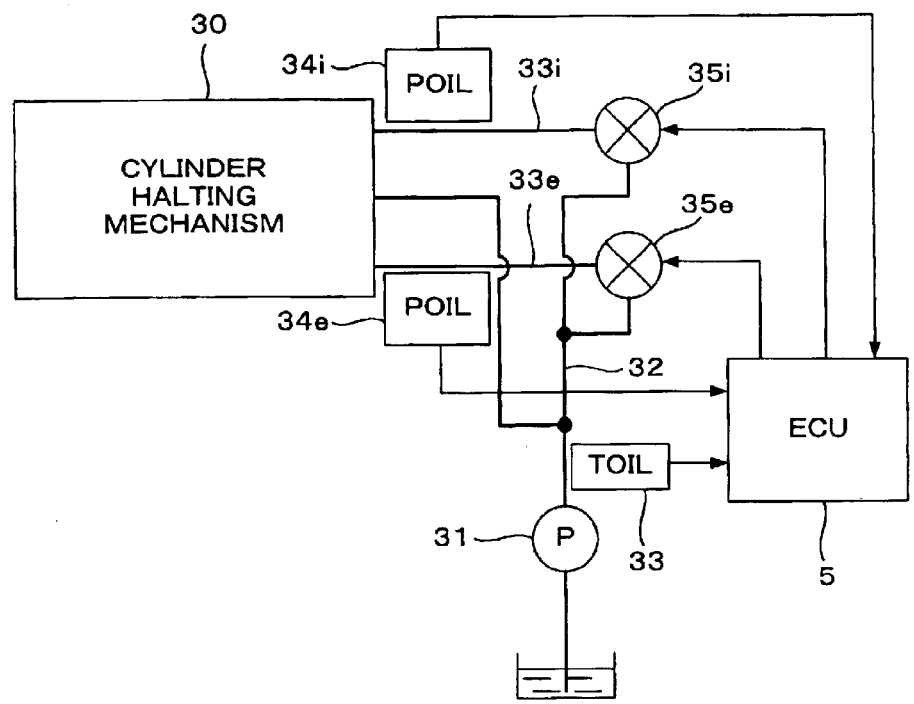
FIG. 2 is a block diagram of a hydraulic circuit used to hydraulically drive a cylinder halting mechanism and a corresponding control system according to the first embodiment of the present invention.

FIG. 1 is a schematic diagram of an internal combustion engine and a corresponding control system according to a first embodiment of the present invention. The engine is a V-type six-cylinder internal combustion engine (hereinafter "engine") 1 having a right bank provided with cylinders #1, #2, and #3 and a left bank provided with cylinders #4, #5, and #6. The right bank is further provided with a cylinder halting mechanism 30 for temporarily halting the operation of the cylinders #1 to #3. FIG. 2 is a block diagram of a hydraulic circuit used to hydraulically drive the cylinder halting mechanism 30 and a corresponding control system for the hydraulic circuit. FIG. 2 will also be referred to in conjunction with FIG. 1.

The engine 1 has an intake pipe 2 provided with a throttle valve 3. The throttle valve 3 is provided with a throttle valve opening sensor 4 for detecting an opening TH of the throttle valve 3. A detection signal output from the throttle opening sensor 4 is supplied to an electronic control unit (hereinafter "ECU") 5.

Fuel injection valves 6, for respective cylinders, are inserted into the intake pipe 2 at locations intermediate the engine 1 and the throttle valve 3, slightly upstream of respective intake valves (not shown). Each fuel injection valve 6 is connected to a fuel pump (not shown) and electrically connected to the ECU 5. A valve opening period of each fuel injection valve 6 is controlled by a signal from the ECU 5.

An absolute intake pressure (PBA) sensor 7 is provided immediately downstream of the throttle valve 3 for detecting a pressure in the intake pipe 2. An absolute pressure signal, which is converted to an electrical signal by the absolute intake pressure sensor 7, is supplied to the ECU 5. An intake air temperature (TA) sensor 8 is provided downstream of the absolute intake pressure sensor 7 relative to the throttle valve 3 and detects an intake air temperature TA. An electrical signal corresponding to the detected intake air temperature TA is output from the intake air temperature sensor 8 and supplied to the ECU 5.

An engine coolant temperature (TW) sensor 9, such as, for example only, a thermistor, is mounted on the body of the engine 1 to detect an engine coolant temperature, e.g., a cooling water temperature, TW. A temperature signal corresponding to the detected engine coolant temperature TW is output from the engine coolant temperature sensor 9 and supplied to the ECU 5.

A crank angle position sensor 10 for detecting a rotational angle of the engine crankshaft (not shown) is connected to the ECU 5, and a signal corresponding to the detected rotational angle of the engine crankshaft is supplied to the ECU 5. The crank angle position sensor 10 includes a cylinder discrimination sensor for outputting a pulse at a predetermined crank angle position for a specific cylinder of the engine 1 (this pulse is hereinafter referred to as "CYL pulse"). The crank angle position sensor 10 also includes a top dead center (TDC) sensor for outputting a TDC pulse at a crank angle position before the top dead center (TDC) of a predetermined crank angle starting at an intake stroke in each cylinder, e.g., at every 120 deg crank angle in the case of a six-cylinder engine, and a CRK sensor for generating one pulse with a constant crank angle period, e.g., a period of 30 deg, shorter than the period of generation of the TDC pulse (this pulse is hereinafter referred to as "CRK pulse"). The CYL pulse, the TDC pulse, and the CRK pulse are supplied to the ECU 5 and are used to control various timings, such as, for example only, a fuel injection timing and an ignition timing, as well as for detecting an engine rotational speed NE.

The cylinder halting mechanism 30 is hydraulically driven using lubricating oil of the engine 1 as operating oil. The operating oil, which is pressurized by an oil pump 31, is supplied to the cylinder halting mechanism 30 via an oil passage 32, an intake side oil passage 33$i$, and an exhaust side oil passage 33$e$. An intake side solenoid valve 35$i$ is provided between the oil passages 32 and 33$i$ and an exhaust side solenoid valve 35$e$ is provided between oil passages 32 and 33$e$. The solenoid valves 35$i$ and 35$e$ are connected to and controlled by the ECU 5.

Hydraulic switches 34$i$ and 34$e$, which are turned on when the operating oil pressure drops to a pressure lower than a predetermined threshold value, are provided for the oil passages 33$i$ and 33$e$, respectively. Detection signals from the hydraulic switches 34$i$ and 34$e$ are supplied to the ECU 5. An operating oil temperature sensor 33 for detecting an operating oil temperature TOIL is provided in the oil passage 32, and a detection signal from the operating oil temperature sensor 33 is supplied to the ECU 5.

An exemplary configuration of the cylinder halting mechanism 30 is disclosed in Japanese Patent Laid-open No.

Hei 10-103097, and a mechanism of a similar configuration is used for the cylinder halting mechanism 30 herein. According to this mechanism 30, when the solenoid valves 35i and 35e are closed and the operating oil pressures in the oil passages 33i and 33e are low, the intake valves and the exhaust valves of the cylinders, e.g., #1 to #3, perform normal opening and closing movements. However, when the solenoid valves 35i and 35e are open and the operating oil pressures in the oil passages 33i and 33e are high, the intake valves and the exhaust valves of the cylinders, e.g., #1 to #3, maintain their closed state. In other words, while the solenoid valves 35i and 35e are closed, all-cylinder operation of the engine 1, wherein all cylinders are operating, is performed, and if the solenoid valves 35i and 35e are open, partial-cylinder operation, wherein predetermined cylinders, e.g., #1 to #3, are not operating, and other predetermined cylinders, e.g., #4 to #6, are operating, is performed.

A spark plug 12 is provided in each cylinder of the engine 1. Each spark plug 12 is connected to the ECU 5, and a drive signal for each spark plug 12, i.e., an ignition signal, is supplied from the ECU 5.

A knock sensor 11 for detecting high-frequency vibrations is mounted on the engine 1 at a suitable position, and a detection signal output from the knock sensor 11 is supplied to the ECU 5.

The ECU 5 includes an input circuit, a central processing unit (hereinafter "CPU"), a memory circuit, and an output circuit. The input circuit has various functions, including a function of shaping the waveforms of input signals from the various sensors, a function of correcting the voltage levels of the input signals to a predetermined level, and a function of converting analog signal values into digital signal values. The memory circuit preliminarily stores various operating programs to be executed by the CPU and stores the results of computation or the like by the CPU. The output circuit supplies drive signals to the fuel injection valves 6. The ECU 5 controls the valve opening period of each fuel injection valve 6, the ignition timing, etc. according to the detection signals from the various sensors. The ECU 5 further operates the solenoid valves 35i and 35e to perform switching control between all-cylinder operation and partial-cylinder operation of the engine 1.

The ECU 5 further performs knocking determination according to the output signal from the knock sensor 11 to correct the ignition timing according to the result of the knocking determination.

Figure 3:
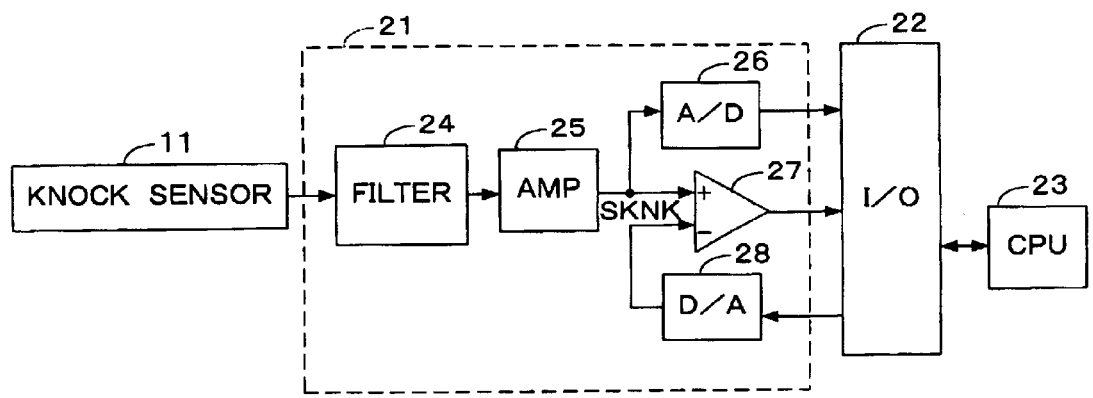
FIG. 3 is a block diagram of a knocking determination circuit according to the first embodiment of the present invention.

FIG. 3 is a block diagram of a part of the circuits in the ECU 5, that is, a configuration of a circuit for performing the knocking determination according to the output signal from the knock sensor 11. The knocking determination circuit includes an analog circuit section 21, an input/output interface circuit 22, and a CPU 23. The analog circuit section 21 includes a filter 24, an amplifier circuit 25, an A/D converter circuit 26, a comparator 27, and a D/A converter circuit 28.

The filter 24 removes a high-frequency component from the output signal of the knock sensor 11, and the amplifier circuit 25 amplifies the output signal of the filter 24. An output signal SKNK of the amplifier circuit 25 is input to the A/D converter circuit 26 and the comparator 27. The A/D converter circuit 26 converts the input signal to a digital signal. The digital signal is input to the CPU 23 via the input/output interface circuit 22. As will be hereinafter described, the CPU 23 detects the knock sensor output during a noise gate period as a noise level VNOISE, and calculates a determination threshold KLVL according to the noise level VNOISE. The CPU 23 supplies a digital signal corresponding to the determination threshold KLVL through the input/output interface circuit 22 to the D/A converter circuit 28. The D/A converter circuit 28 converts the digital signal corresponding to the determination threshold KLVL to an analog signal, which is supplied to the comparator 27. The comparator 27 compares the determination threshold KLVL with a level (hereinafter "knock level") KNC of the output signal SKNK from the amplifier circuit 25, and outputs a pulse when the knock level KNC exceeds the determination threshold KLVL. The pulse indicating the occurrence of knocking is input to the CPU 23 via the input/output interface circuit 22.

Figure 4:
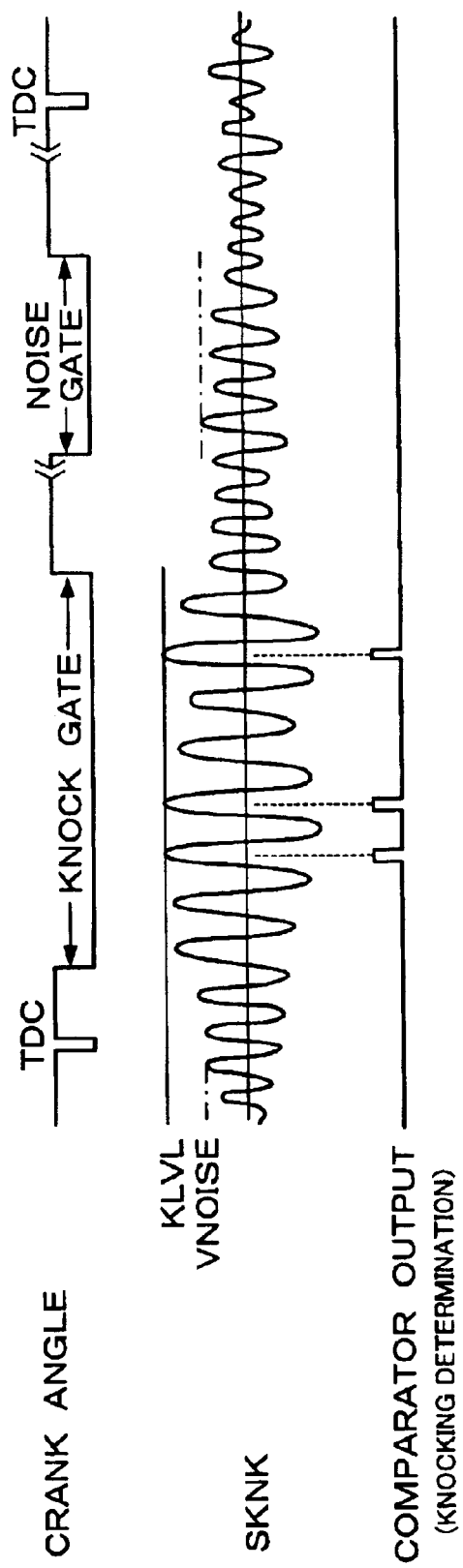
FIG. 4 is a time chart of a knocking determination method according to the first embodiment of the present invention.

As shown in FIG. 4, a knock gate period during which the knocking determination is performed and a noise gate period during which the noise level VNOISE is detected, are set within one TDC period, i.e., a period from the time a TDC pulse is generated to the time the next TDC pulse is generated. When the knock level, i.e., the level of the output signal SKNK from the amplifier circuit 25, KNC exceeds the determination threshold KLVL, it is determined that knocking has occurred.

Figure 5:
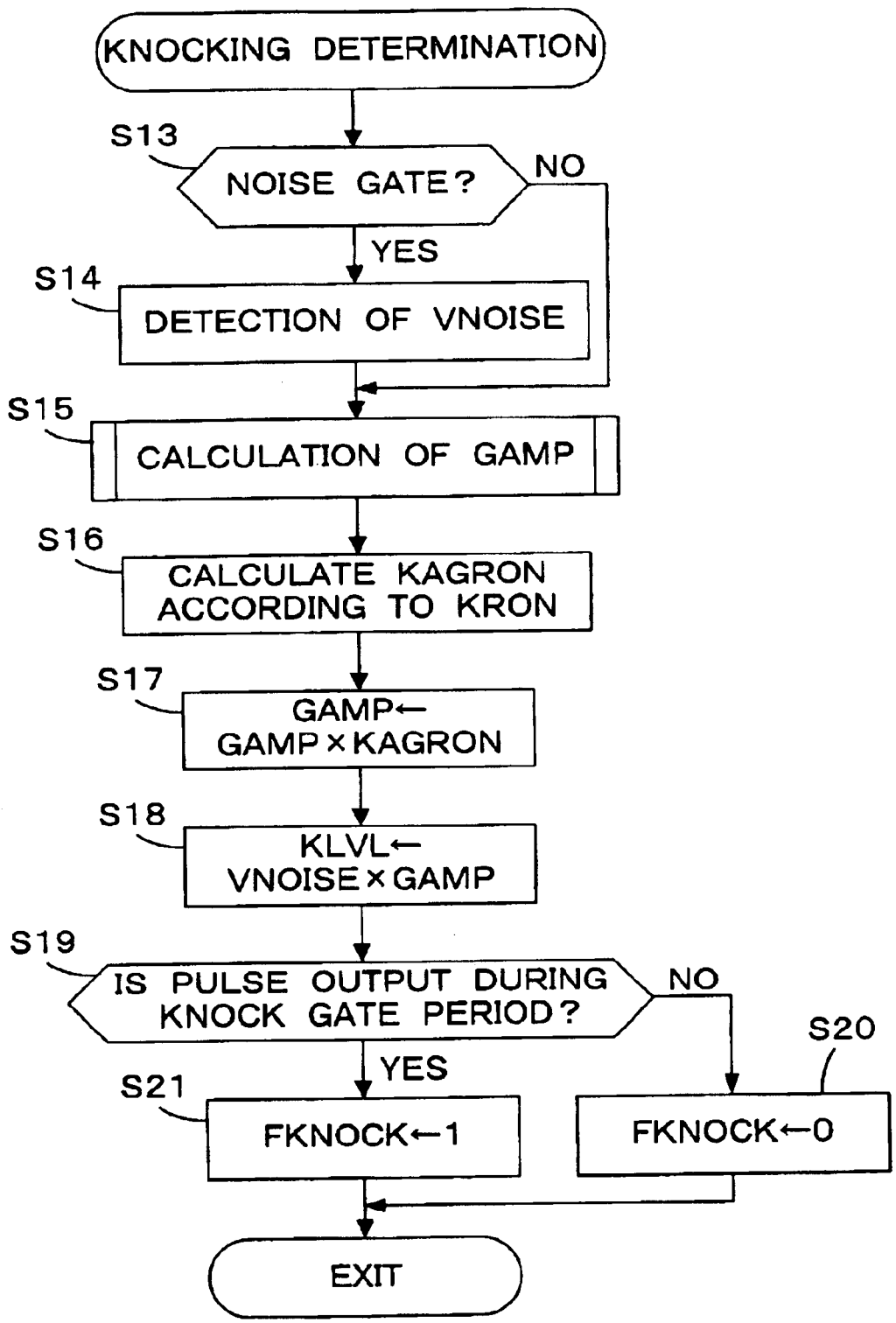
FIG. 5 is a flowchart of a knocking determination process according to the first embodiment of the present invention.

FIG. 5 is a flowchart of a knocking determination process executed by the CPU 23. Execution of the knocking determination process is synchronized with generation of the CRK pulse.

In step S13, it is determined whether the present execution of the knocking determination process is in the noise gate period. If the present execution of the knocking determination process is in the noise gate period, a noise level VNOISE is detected, i.e., step S14. If the present execution of the knocking determination process is not in the noise gate period, the program skips step S14 and proceeds to step S15.

Figure 6:
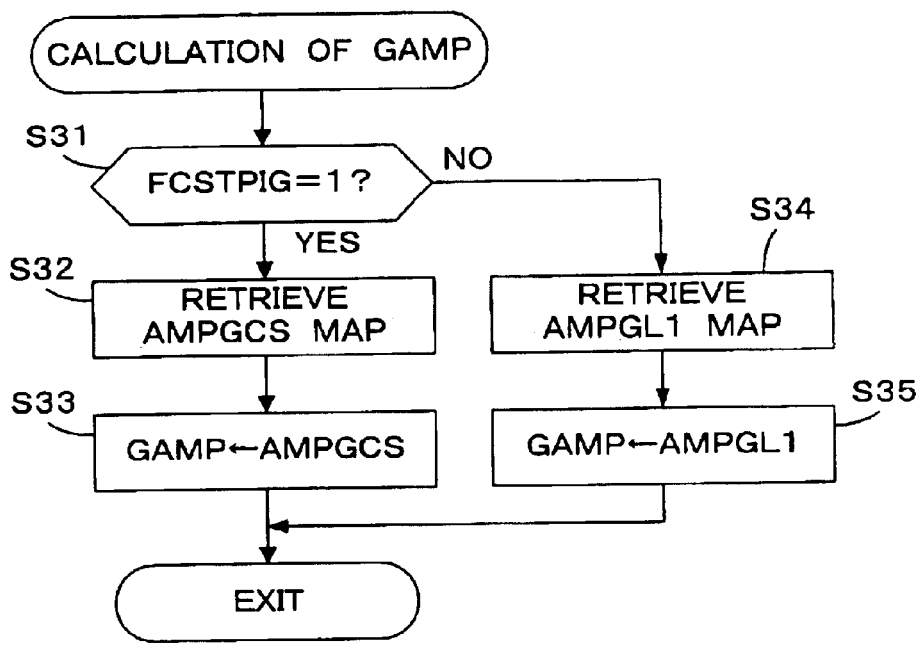
FIG. 6 is a flowchart of a calculation process of a gain coefficient (GAMP) used in the knocking determination process of FIG. 5.

In step S15, a GAMP calculation process, which is shown in FIG. 6, is executed to calculate a gain coefficient GAMP. In step S18, the noise level VNOISE is multiplied by the gain coefficient GAMP to calculate a determination threshold KLVL.

In step S31 of FIG. 6, it is determined whether a cylinder halt flag FCSTPIG is "1". The cylinder halt flag FCSTPIG is set to "1" when partial-cylinder operation is performed to halt operation of predetermined cylinders, e.g., #1 to #3. If the answer to step S31 is negative, i.e., NO, which indicates that all-cylinder operation is being performed, an AMPGL1 map (not shown) is retrieved according to the engine rotational speed NE and the absolute intake pressure PBA to calculate a first map value AMPGL1 (step S34). The AMPGL1 map is set so the first map value AMPGL1 increases with an increase in the engine rotational speed NE and an increase in the absolute intake pressure PBA. In step S35, the gain coefficient GAMP is set to the first map value AMPGL1 and the GAMP calculation process ends.

If the answer to step S31 is affirmative, i.e., YES, which indicates partial-cylinder operation is being performed, an AMPGCS map (not shown) is retrieved according to the engine rotational speed NE and the absolute intake pressure PBA to calculate a second map value AMPGCS (step S32). The AMPGCS map is set so the second map value AMPGCS increases with an increase in the engine rotational speed NE and an increase in the absolute intake pressure PBA. Further, the second map value AMPGCS is set to a value smaller than the first map value AMPGL1, when comparing at the same engine rotational speed NE and the same absolute intake pressure PBA.

In step S33, the gain coefficient GAMP is set to the second map value AMPGCS and the GAMP calculation process ends.

Figure 7:
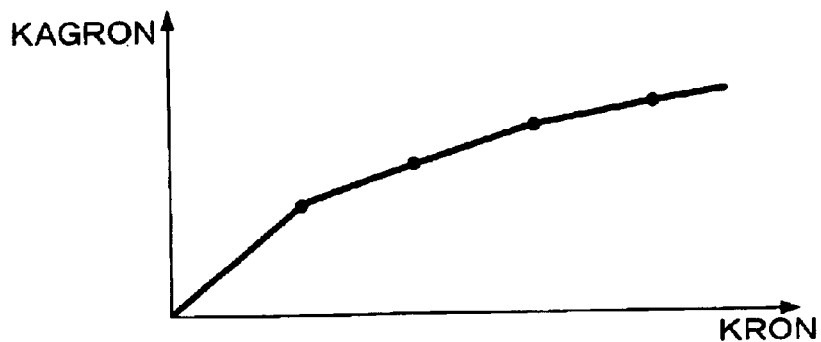
FIG. 7 is a graph showing a table used in the gain coefficient calculation process of FIG. 6.

Referring back to FIG. 5, in step S16, a KAGRON table, which is shown in FIG. 7, is retrieved according to an estimated octane KRON of the fuel in use, thereby calculating a gain correction coefficient KAGRON. A calculation method of the estimated octane KRON will be described below.

In step S17, the gain coefficient GAMP calculated in step S15 is multiplied by the gain correction coefficient KAGRON calculated in step S16 to calculate a corrected gain coefficient GAMP. Then, the noise level VNOISE and the gain coefficient GAMP are applied to Eq. (1) shown below to calculate a determination threshold KLVL (step S18).

$$KLVL = VNOISE \times GAMP \quad (1)$$

As mentioned above, the determination threshold KLVL calculated above is converted into an analog signal by the D/A converter circuit 28, and the analog signal is supplied to the comparator 27.

In step S19, it is determined whether a pulse has been output from the comparator 27 during the knock gate period. If a pulse has been output from the comparator 27 during the knock gate period, it is determined that knocking has occurred and a knocking flag FKNOCK is set to "1" (step S21). If the answer to step S19 is negative, i.e., NO, the knocking flag FKNOCK is set to "0" (step S20).

Figure 8A:
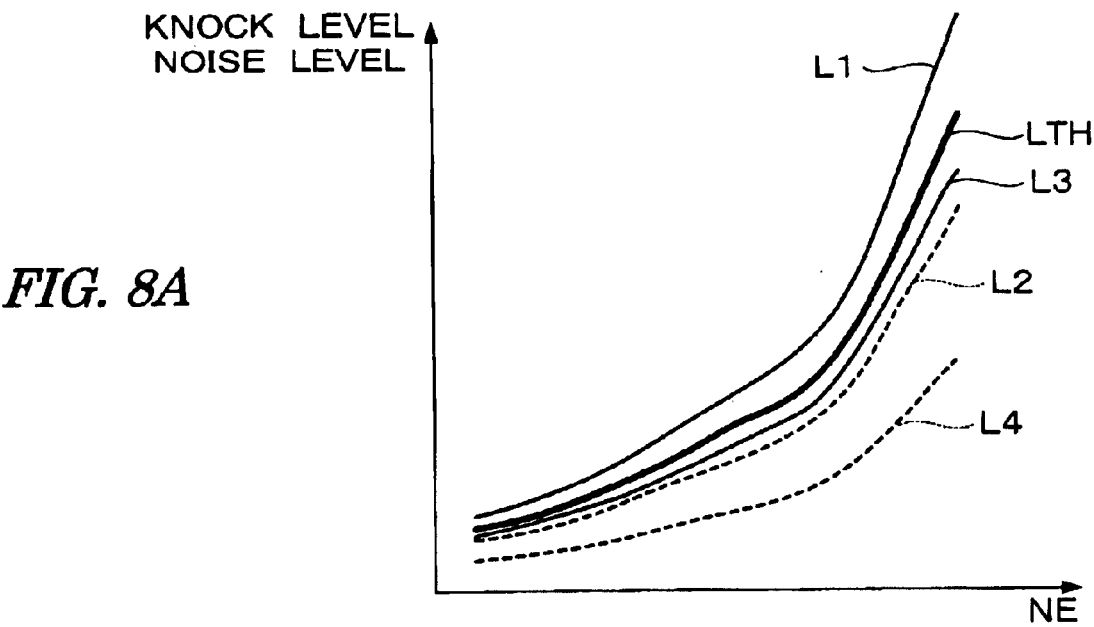
FIGS. 8A and 8B are graphs showing a relation between an engine rotational speed (NE) and levels of a signal and a noise output from a knock sensor according to the first embodiment of the present invention.
Figure 8B:
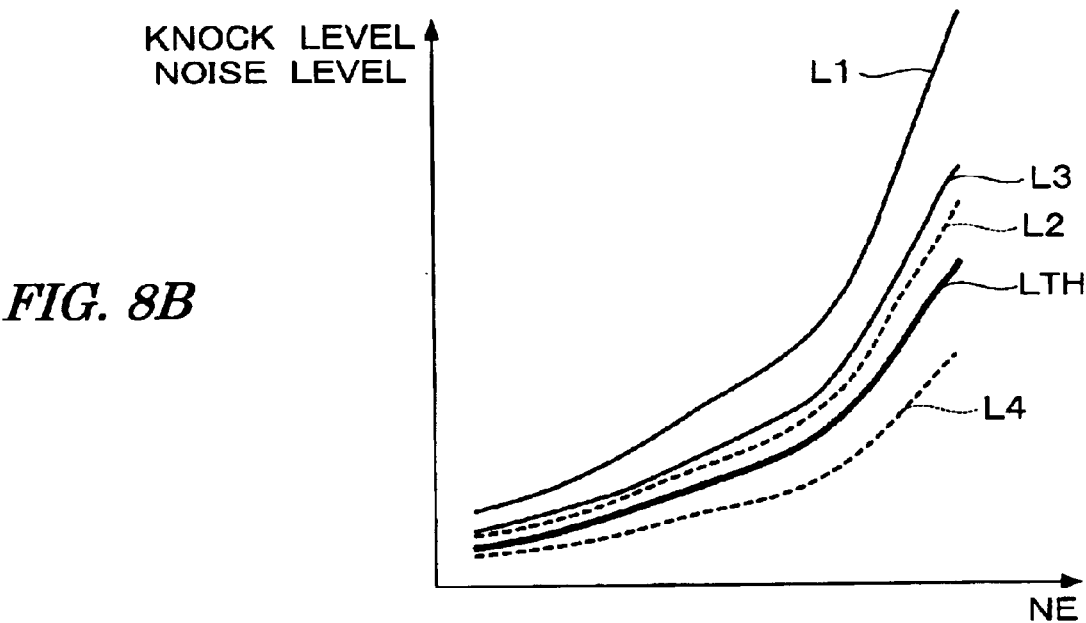

The graphs of FIGS. 8A and 8B show changes in the knock level KNC and determination threshold KLVL relative to changes in the engine rotational speed NE. In FIGS. 8A and 8B, solid lines L1 and L3 show knock levels KNC upon occurrence of knocking, wherein the solid line L1 corresponds to a knock level during all-cylinder operation and the solid line L3 corresponds to a knock level during partial-cylinder operation. Broken lines L2 and L4 show noise levels VNOISE, wherein the broken line L2 corresponds to a noise level during all-cylinder operation and the broken line L4 corresponds to a noise level during partial-cylinder operation. A solid line LTH in FIG. 8A corresponds to a determination threshold KLVL for all-cylinder operation, and a solid line LTH in FIG. 8B corresponds to a determination threshold KLVL for partial-cylinder operation.

As apparent from FIGS. 8A and 8B, the determination threshold KLVL for partial-cylinder operation is set to a value less than the determination threshold KLVL value for all-cylinder operation. Accordingly, a proper determination threshold is obtained in response to a reduction in the knock level upon occurrence of knocking and the noise level, so that accurate knocking determination is performed both during partial-cylinder and all-cylinder operations.

The CPU 23 corrects the ignition timing according to the result of the knocking determination, that is, according to the value of the knocking flag FKNOCK, and controls the ignition timing within the range where no knocking occurs, so that the engine output is maximized.

Further, the estimated octane KRON of the fuel in use is calculated in a manner described below using a computing process executed by the CPU 23.

First, the estimated octane KRON is set to an average octane KRONO. When the condition where knocking is not detected by the process of FIG. 5 continues for a predetermined ignition time period, i.e., a time period during which a predetermined number of TDC pulses are generated, an addition term DRUP, set according to the engine rotational speed NE and the absolute intake pressure PBA, is calculated, and the estimated octane KRON is incremented by the addition term DRUP in accordance with Eq. (2) shown below.

$$KRON = KRON + DRUP \quad (2)$$

On the other hand, when knocking is detected by the knocking determination process of FIG. 5, the estimated octane KRON is decremented by applying a predetermined subtraction value DRDOWN to Eq. (3) shown below.

$$KRON = KRON - DRDOWN \quad (3)$$

By making such a computation, the estimated octane KRON becomes a value depending on the frequency knocking is occurring, and the value can be used as a parameter approximating the octane of the fuel in use.

Further, the estimated octane KRON thus calculated is subjected to a limit process so that it falls within a predetermined range from a lower limit to an upper limit.

An example of the details of the octane estimation method is described in Japanese Patent No. 2844418.

In this embodiment, the CPU 23, the input/output interface circuit 22, and the D/A converter circuit 28 form the determination threshold setting means. The comparator 27 forms the knocking determination means and the CPU 23 forms the control means.

Figure 9:
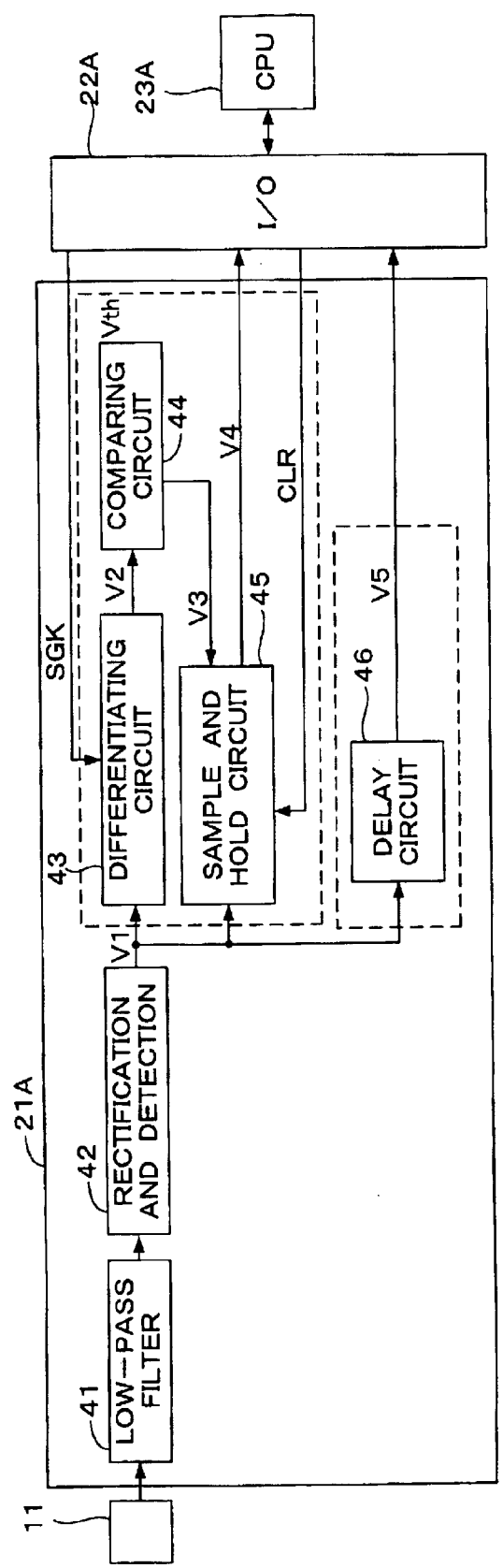
FIG. 9 is a block diagram of a knocking determination circuit according to a second embodiment of the present invention.

FIG. 9 is a block diagram of a knocking determination circuit according to a second embodiment of the present invention. In this embodiment, a knocking determination circuit shown in FIG. 9 is provided in the ECU 5 instead of the circuit shown in FIG. 3. The second embodiment of the knocking determination circuit is similar to the circuit discussed with respect to the first embodiment, except for the following differences.

The knocking determination circuit shown in FIG. 9 includes an analog circuit section 21A, an input/output interface circuit 22A, and a CPU 23A. The analog circuit section 21A includes a low-pass filter 41, a rectification and detection circuit 42, a differentiating circuit 43, a comparing circuit 44, a sample and hold circuit 45, and a delay circuit 46. In this embodiment, the input/output interface circuit 22A includes an A/D converter circuit for converting an analog signal input from the analog circuit section 21A into a digital signal and supplying the digital signal to the CPU 23A. Further, the input/output interface circuit 22A generates a knock gate signal SGK and a clear signal CLR according to an output signal from the CPU 23A, and supplies the knock gate signal SGK and the clear signal CLR to the differentiating circuit 43 and the sample and hold circuit 45, respectively.

Figure 10:
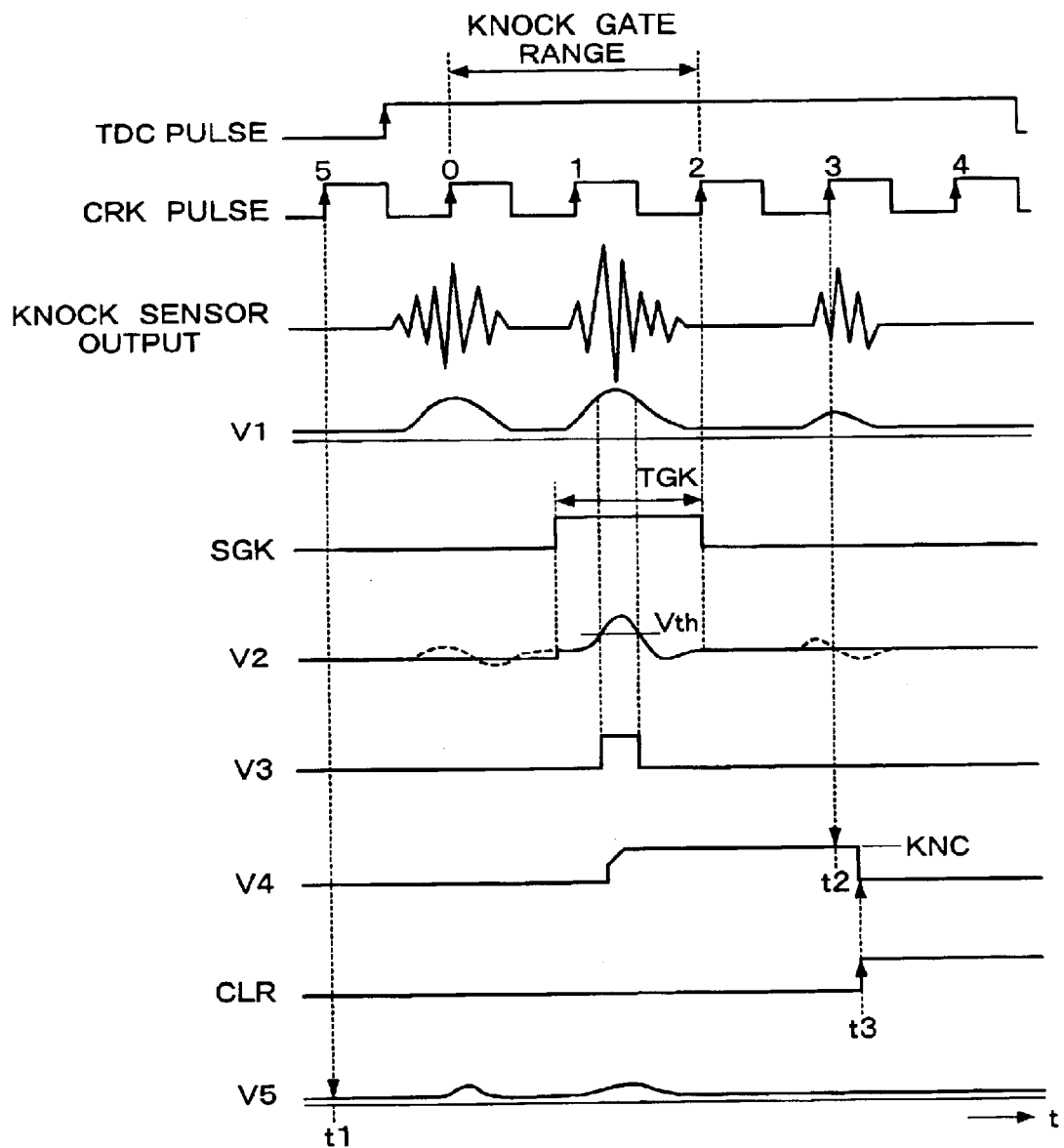
FIG. 10 is a time chart of a knocking determination method according to the second embodiment of the present invention.

FIG. 10 is a time chart illustrating operation of the embodiment of the knocking determination circuit shown in FIG. 9. Operation of the knocking determination circuit will now be described with reference to FIGS. 9 and 10.

A high-frequency component of the output signal from the knock sensor 11 is removed by the low-pass filter 41, and the remaining component of the signal output from the knock sensor 11 is input to the rectification and detection circuit 42. The rectification and detection circuit 42 rectifies and detects an input signal to output a rectified and detected signal V1. A knock gate signal SGK is supplied from the CPU 23A to the differentiating circuit 43. The differentiating circuit 43 differentiates the rectified and detected signal V1, i.e., removes a low-frequency component of the input signal V1, to output a differential signal V2 only during the knock gate period TGK. The comparing circuit 44 compares the differential signal V2 with a preset threshold voltage Vth, and outputs a pulse signal V3 which becomes a high level during a period when the differential signal V2 exceeds the threshold voltage Vth. The sample and hold circuit 45 samples the rectified and detected signal V1 during the period when the pulse signal V3 is at a high level, holds a peak value, and outputs a sample and hold signal V4. The CPU 23A detects a level (hereinafter "knock level") KNC of the sample and hold signal V4 at time t2. Further, the CPU 23A outputs a clear signal CLR for the sample and hold circuit 45 at time t3 to clear the hold level.

The delay circuit 46 delays the rectified and detected signal V1 by a predetermined time period to output a delayed signal V5. The CPU 23A detects the level of the delayed signal V5 as a noise level VNOISE at time t1.

Figure 11:
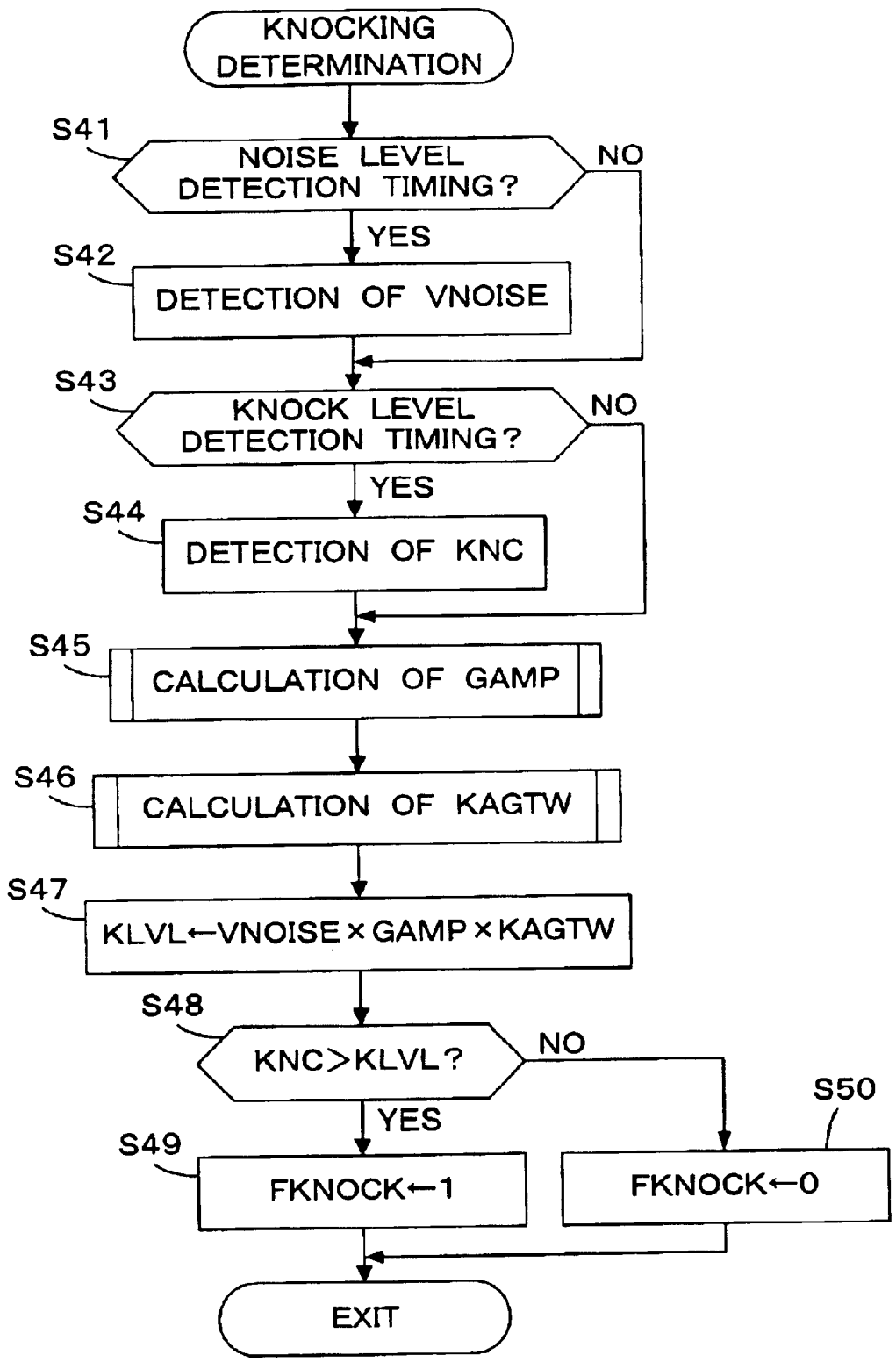
FIG. 11 is a flowchart of a knocking determination process according to the second embodiment of the present invention.

FIG. 11 is a flowchart of a knocking determination process executed by the CPU 23A. Execution of the knocking determination process is synchronized with generation of a CRK pulse.

In step S41, it is determined whether the present execution timing coincides with the detection timing of the noise level VNOISE, i.e., time t1 in FIG. 10. If the answer to step S41 is negative, i.e., NO, the program proceeds directly to step S43. If the answer to step S41 is affirmative, i.e., YES, the noise level VNOISE is detected (step S42).

In step S43, it is determined whether the time coincides with the detection timing for the knock level KNC, i.e., time t2 in FIG. 10. If the answer to step S43 is negative, i.e., NO, the program proceeds directly to step S45, whereas if the answer to step S43 is affirmative, i.e., YES, the knock level KNC is detected (step S44).

In step S45, the GAMP calculation process, which is shown in FIG. 6, is executed to calculate a gain coefficient GAMP. In step S46, a KAGTW calculation process, which is shown in FIG. 12, is executed to calculate a correction coefficient KAGTW.

Figure 12:
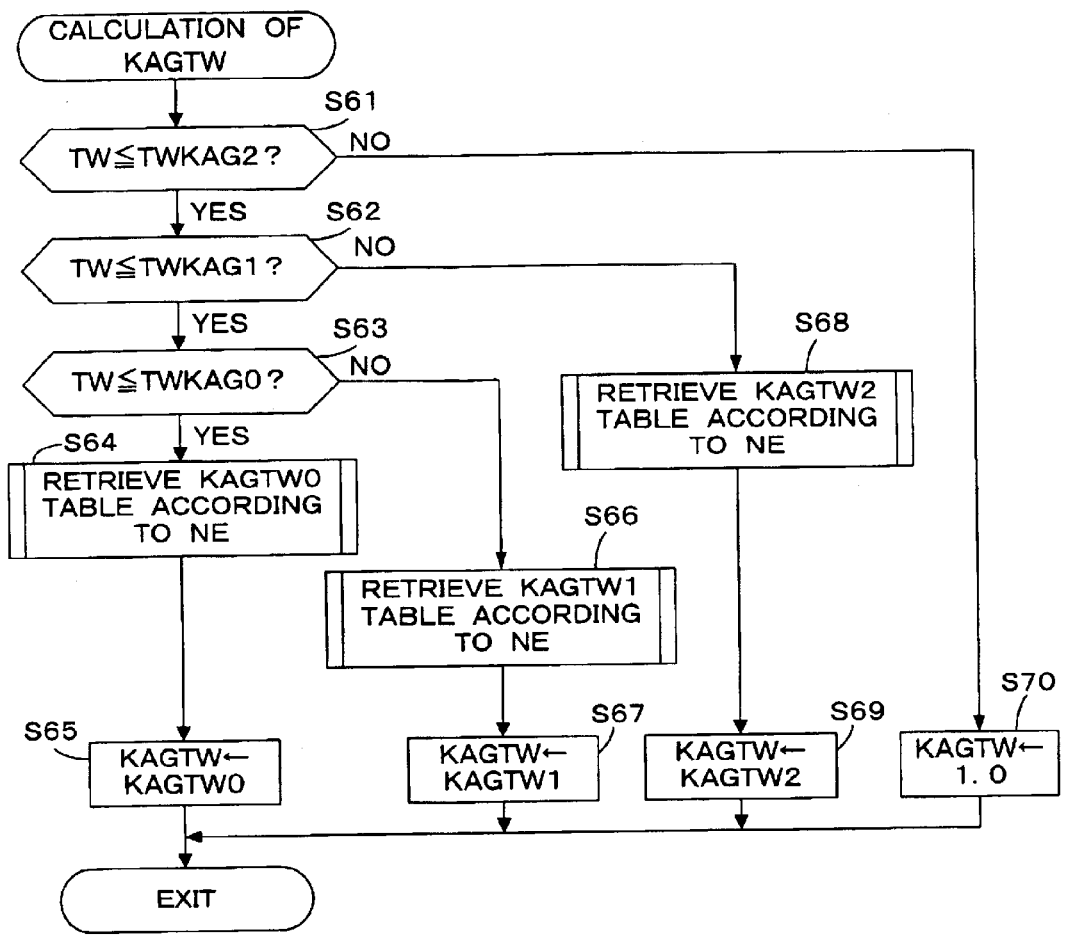
FIG. 12 is a flowchart of a calculation process of a determination threshold correction coefficient (KAGTW) used in the knocking determination process of FIG. 11.

In step S61 of FIG. 12, it is determined whether the engine coolant temperature TW is less than or equal to a third predetermined water temperature TWKAG2, e.g., 70 degrees Centigrade. If TW is greater than TWKAG2, the correction coefficient KAGTW is set to "1.0" (noncorrective value) (step S70).

Figure 13:
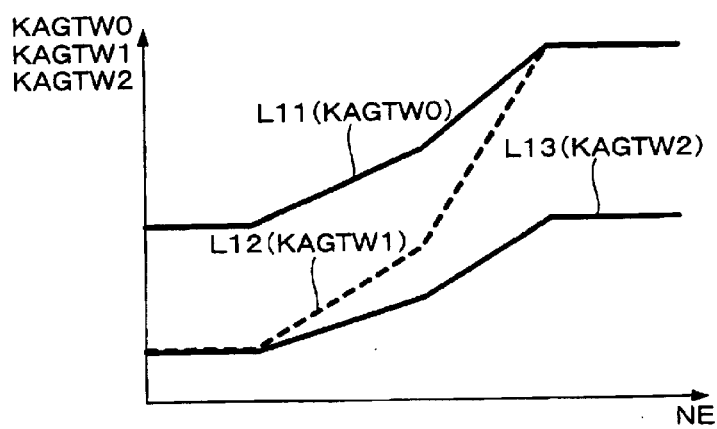
FIG. 13 is a graph of tables used in the knocking determination process of FIG. 12.

If TW is less than or equal to TWKAG2 in step S61, it is determined whether the engine coolant temperature TW is less than or equal to a second predetermined water temperature TWKAG1, e.g., 60 degrees Centigrade, which is lower than the third predetermined water temperature TWKAG2 (step S62). If the answer to step S62 is negative, i.e., NO, that is, if TW is greater than TWKAG1 and less than or equal to TWKAG2, a KAGTW2 table (solid line L13) shown in FIG. 13 is retrieved according to the engine rotational speed NE to calculate a third coefficient value KAGTW2 (step S68). The KAGTW2 table is set so the third coefficient value KAGTW2 increases with an increase in the engine rotational speed NE. Thereafter, the correction coefficient KAGTW is set to the third coefficient value KAGTW2 (step S69).

If TW is less than or equal to TWKAG1 in step S62, it is determined whether the engine coolant temperature TW is less than or equal to a first predetermined water temperature TWKAG0, e.g., 40 degrees Centigrade, which is lower than the second predetermined water temperature TWKAG1 (step S63). If the answer to step S63 is negative, i.e., NO, that is, if TW is greater than TWKAG0 and less than or equal to TWKAG1, a KAGTW1 table (broken line L12) shown in FIG. 13 is retrieved according to the engine rotational speed NE to calculate a second coefficient value KAGTW1 (step S66). The KAGTW1 table is set so the second coefficient value KAGTW1 increases with an increase in the engine rotational speed NE. Thereafter, the correction coefficient KAGTW is set to the second coefficient value KAGTW1 (step S67).

If TW is less than or equal to TWKAG0 in step S63, a KAGTW0 table (solid line L11) shown in FIG. 13 is retrieved according to the engine rotational speed NE to calculate a first coefficient value KAGTW0 (step S64). The KAGTW0 table is set so that the first coefficient value KAGTW0 increases with an increase in engine rotational speed NE. Thereafter, the correction coefficient KAGTW is set to the first coefficient value KAGTW0 (step S65).

According to the correction coefficient KAGTW calculation process of FIG. 12, the correction coefficient KAGTW is set to increase with a decrease in the engine coolant temperature TW and with an increase in the engine rotational speed NE.

Referring back to FIG. 11, step S47 is executed to calculate a determination threshold KLVL. That is, the noise level VNOISE, the gain coefficient GAMP, and the correction coefficient KAGTW obtained above are applied to Eq. (4) shown below to calculate a determination threshold KLVL.

$$KLVL = VNOISE \times GAMP \times KAGTW \qquad (4)$$

It is then determined whether the knock level KNC is greater than the determination threshold KLVL (step S48). If KNC is greater than KLVL, it is determined that knocking has occurred, and the knocking flag FKNOCK is set to "1" (step S49). If KNC is less than or equal to KLVL in step S48, it is determined that no knocking has occurred, and the knocking flag FKNOCK is set to "0" (step S50).

Also in this embodiment, the gain coefficient GAMP is set similarly to the first embodiment, wherein a proper determination threshold KLVL is obtained and accurate knocking determination is performed, both during partial-cylinder and all-cylinder operations.

The CPU 23A corrects the ignition timing according to the result of the knocking determination, that is, according to the value of the knocking flag FKNOCK, and controls the ignition timing within the range where no knocking occurs, so the engine output is maximized.

In this embodiment, the delay circuit 46, the input/output interface circuit 22A, and the CPU 23A form the determination threshold setting means, the differentiating circuit 43, and the comparing circuit 44. The sample and hold circuit 45 and the CPU 23A form the knocking determination means. The CPU 23A also forms the control means.

Figure 14:
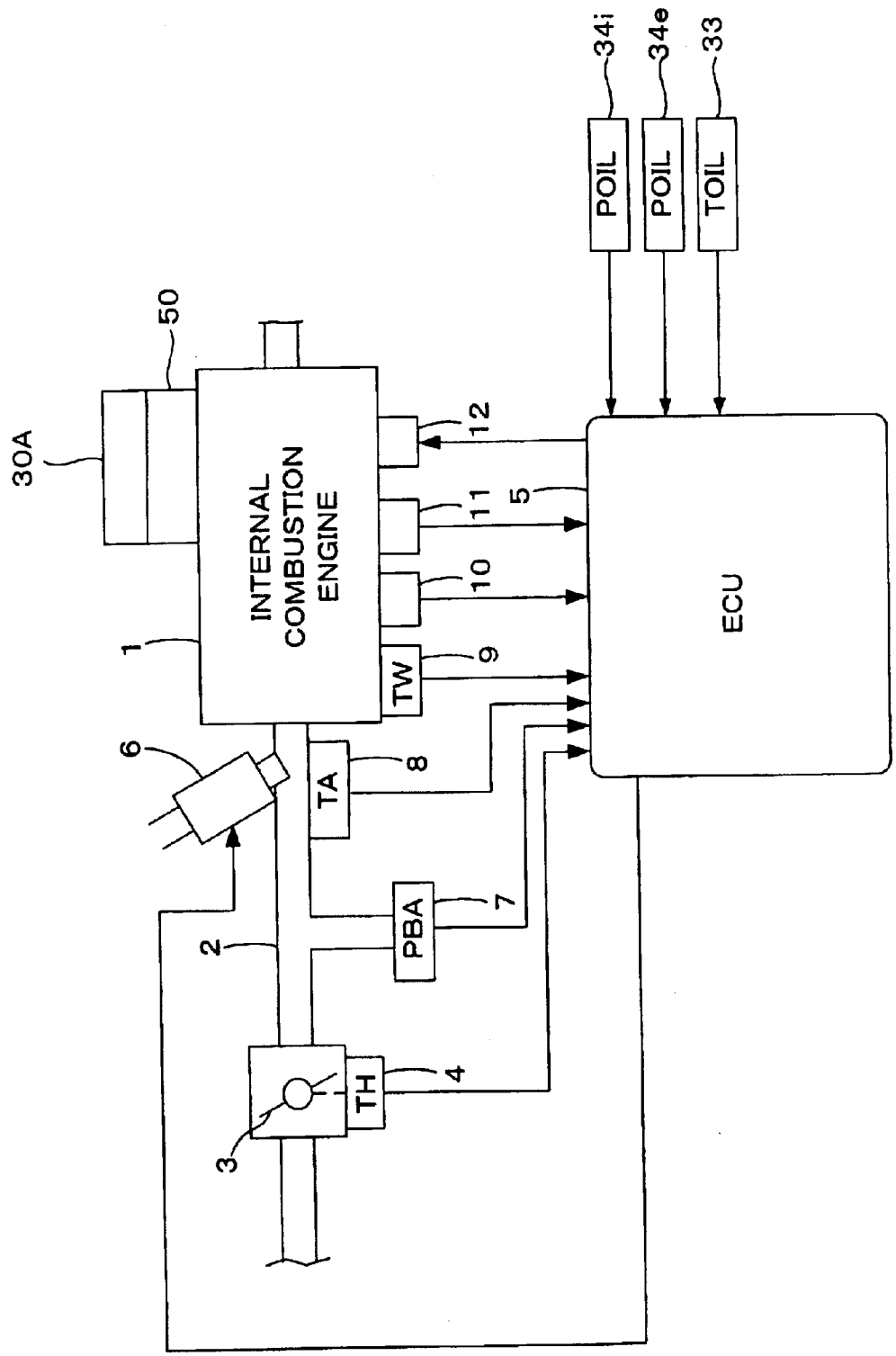
FIG. 14 is a schematic diagram of an internal combustion engine and a corresponding control system according to a third embodiment of the present invention.

FIG. 14 is a schematic diagram of an internal combustion engine and a corresponding control system according to a third embodiment of the present invention. In this embodiment, the engine 1 has a valve timing switching mechanism 50, which switches the valve timing of intake valves and exhaust valves between a high-speed valve timing suitable for a high-speed rotational region of the engine 1 and a low-speed valve timing suitable for a low-speed rotational region of the engine 1. The switching of the valve timing also includes switching of a valve lift amount. The valve timing switching mechanism 50 performs the switching of the valve timing hydraulically. That is, although not shown, a solenoid valve for performing the hydraulic switching and an oil pressure sensor are connected to the ECU 5. A detection signal from the oil pressure sensor is supplied to the ECU 5, and the ECU 5 controls the solenoid valve to perform the switching control of the valve timing according to the operating condition of the engine 1.

The engine 1 is further provided with a cylinder halting mechanism 30A capable of halting the cylinders, e.g., #1 to #3, of the right bank when selecting the low-speed valve timing. When the high-speed valve timing is selected, the all-cylinder operation is always performed. When the low-speed valve timing is selected, switching is made between all-cylinder operation and partial-cylinder operation according to the engine operating condition.

Figure 15:
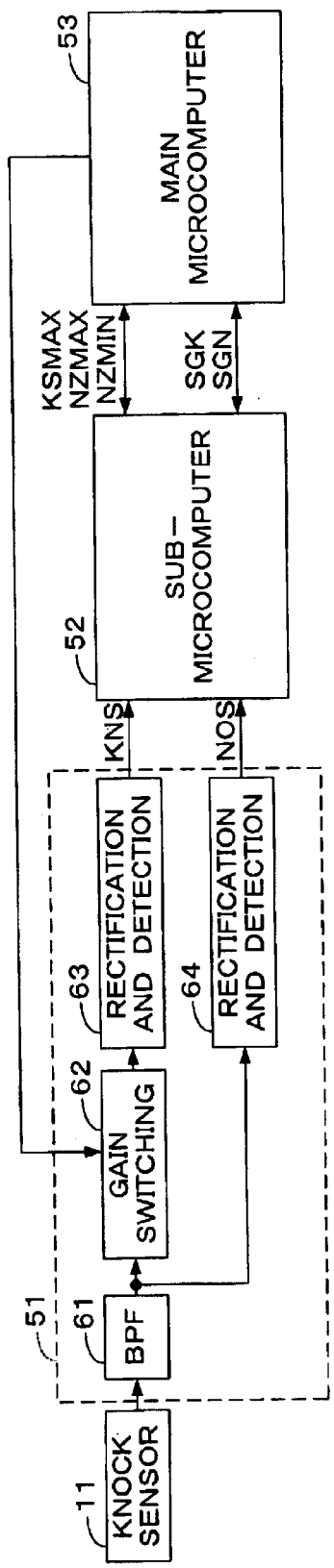
FIG. 15 is a block diagram of a knocking determination circuit according to the third embodiment of the present invention.
Figure 16:
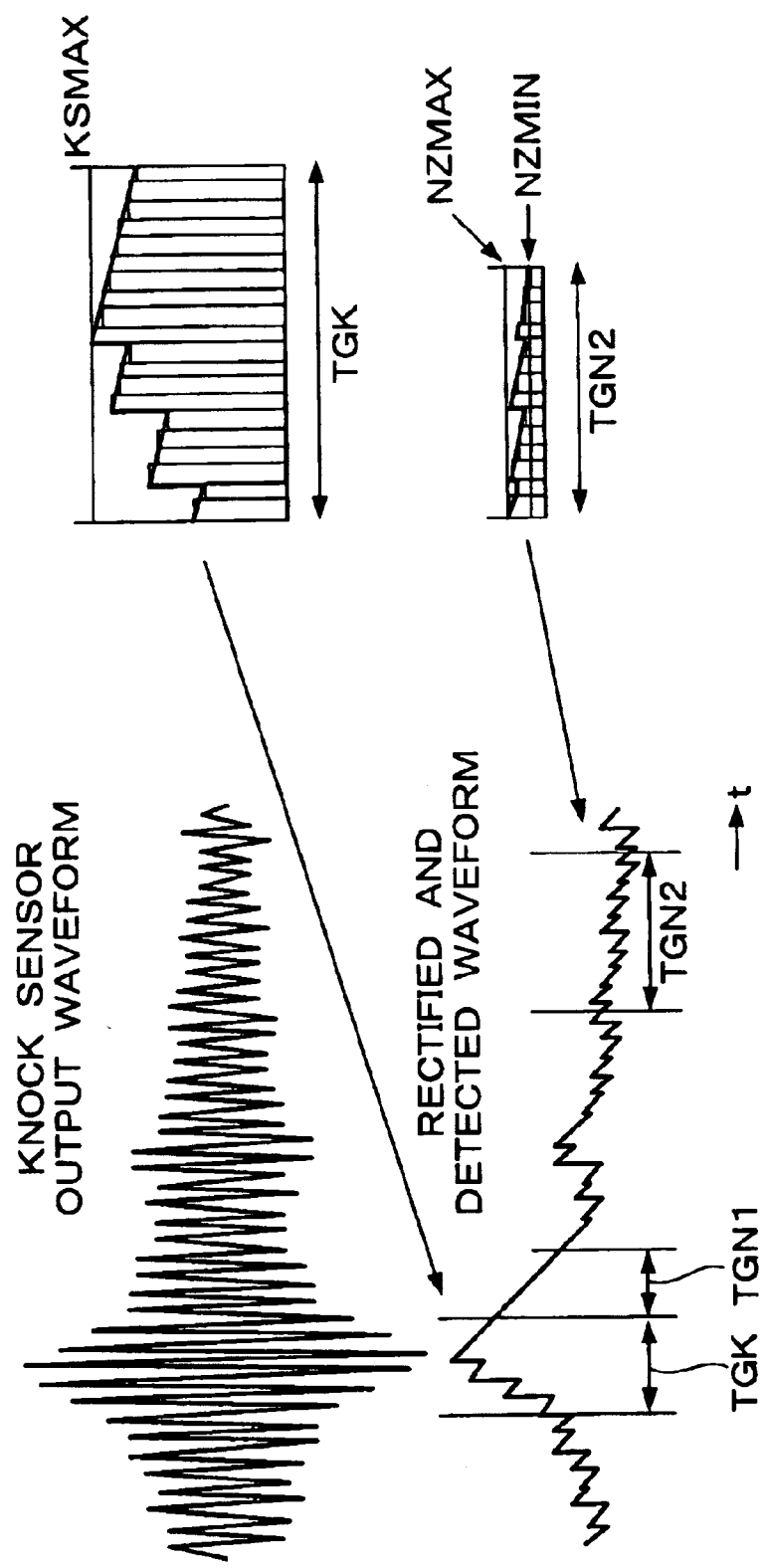
FIG. 16 is a time chart of a knocking determination method according to the third embodiment of the present invention.

FIG. 15 is a block diagram of a knocking determination circuit according to the third embodiment. In this embodiment, the knocking determination circuit shown in FIG. 15 is provided in the ECU 5 instead of the circuit shown in FIG. 3. The third embodiment of the knocking determination circuit is similar to the knocking determination circuits of the first and second embodiments, except for the following differences. FIG. 16 is a signal waveform illustrating a knocking determination method according to the third embodiment and is referred to in conjunction with FIG. 15.

The knocking determination circuit shown in FIG. 15 includes an analog circuit section 51, a sub-microcomputer 52, and a main microcomputer 53. In this embodiment, a resonance type knock sensor is used as the knock sensor 11.

The analog circuit section 51 includes a bandpass filter 61, a gain switching circuit 62, and a pair of rectification and detection circuits 63 and 64. An output from the knock sensor 11 (see the knock sensor output waveform shown in FIG. 16) is input through the bandpass filter 61 to the gain switching circuit 62 and the rectification and detection circuit 64. The gain switching circuit 62 is switched by a control signal from the main microcomputer 53 so the gain decreases ½ times in the high-speed rotational region of the engine 1 and increases four times in the low-speed rotational region of the engine 1. An output signal from the gain switching circuit 62 is input to the rectification and detection circuit 63.

The rectification and detection circuit 63 inputs a signal KNS for detection of a knock level to the sub-microcomputer 52, and the rectification and detection circuit 64 inputs a signal NOS for detection of a noise level to the sub-microcomputer 52 (see the rectified and detected waveform shown in FIG. 16). The sub-microcomputer 52 has an A/D converting function and detects a maximum value of the signal KNS during a knock gate period TGK shown in FIG. 16 as a knock level KSMAX. The sub-microcomputer 52 further detects a maximum value NZMAX and a minimum value NZMIN during noise gate periods TGN1 and TGN2. A knock gate signal SGK indicating the knock gate period TGK and a noise gate signal SGN indicating the noise gate periods TGN1 and TGN2 are supplied from the main microcomputer 53 to the sub-microcomputer 52.

Figure 17:
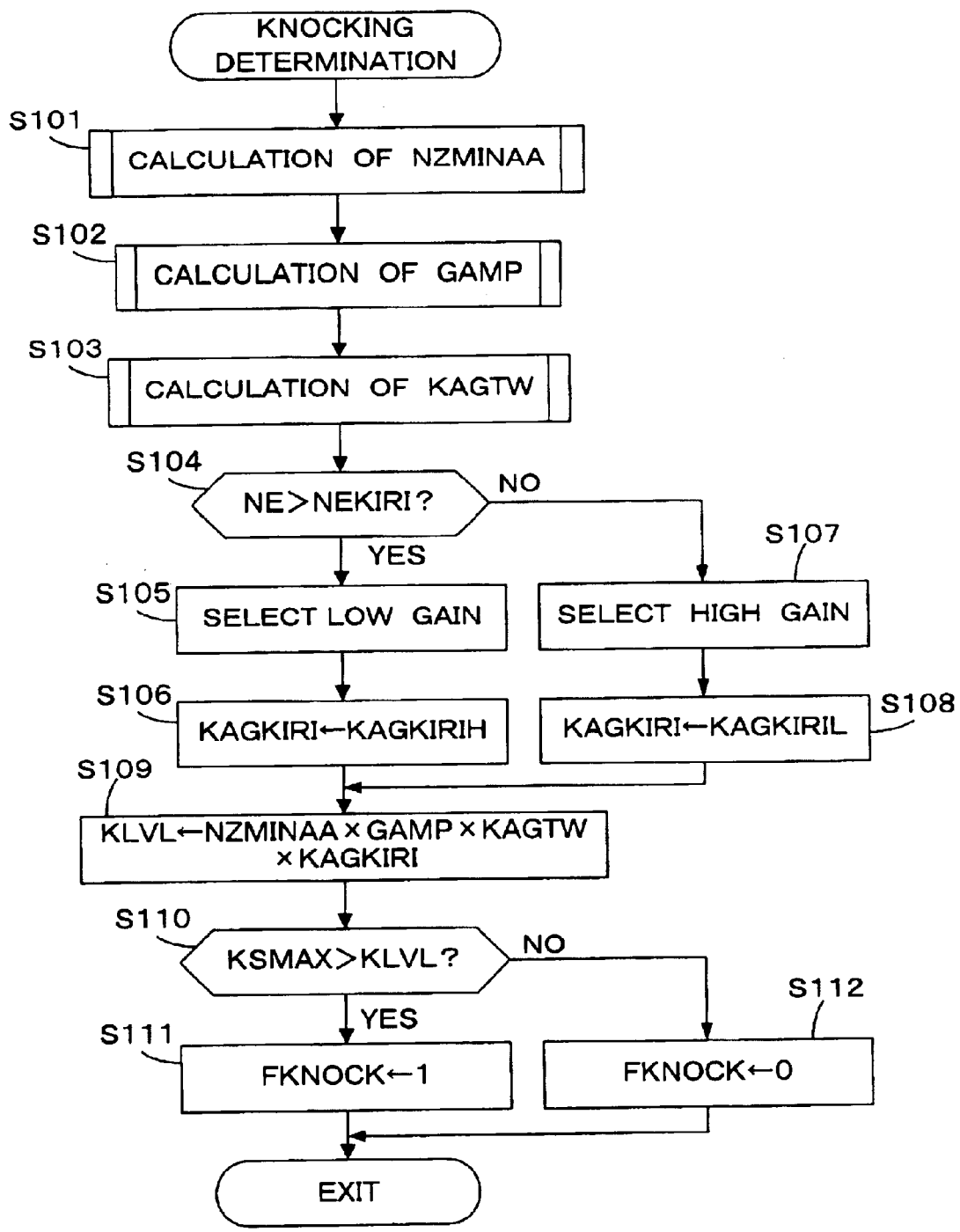
FIG. 17 is a flowchart of a knocking determination process according to the third embodiment of the present invention.

The main microcomputer 53 generates the knock gate signal SGK and the noise gate signal SGN according to the TDC pulse and the CRK pulse, and executes a knocking determination process, which is shown in FIG. 17.

FIG. 17 is a flowchart of the knocking determination process to be executed by the main microcomputer 53. Execution of the knocking determination process is synchronized with the generation of a TDC pulse.

In step S101, a noise level NZMINAA(n) is calculated from Eq. (5) shown below.

$$NZMINAA(n)=[NZMINM(n-3)+NZMINM(n-2)+NZMINAA(n-1)+NZMIN(n)]/4 \quad (5)$$

where NZMINAA(n−3) to NZMINM(n−1) on the right side are past values of the noise level, and NZMIN(n) is the latest detected minimum value of the noise level transmitted from the sub-microcomputer 52.

Figure 18:
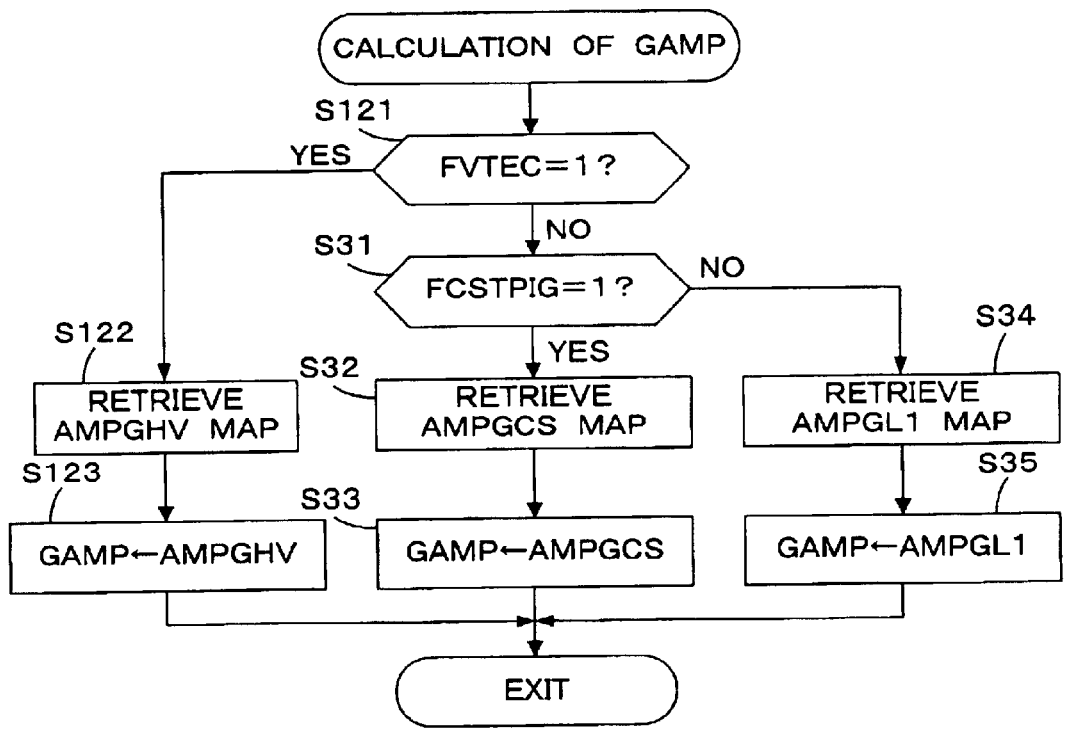
FIG. 18 is a flowchart of a calculation process of a gain coefficient (GAMP) used in the knocking determination process of FIG. 17.

In step S102, a GAMP calculation process, which is shown in FIG. 18, is executed to calculate a gain coefficient GAMP.

Steps S31 to S35 in FIG. 18 are the same as steps S31 to S35 in FIG. 6. In this embodiment, the engine 1 is provided with the valve timing switching mechanism 50, and when the low-speed valve timing is selected, partial-cylinder operation is performed. Accordingly, steps S121 to S123 are added in the process of FIG. 18.

In step S121 in FIG. 18, it is determined whether a valve timing flag FVTEC is "1". If FVTEC is equal to "1", which indicates that high-speed valve timing is selected, an AMPGHV map (not shown) is retrieved according to the engine rotational speed NE and the absolute intake pressure PBA to calculate a third map value AMPGHV for the gain coefficient GAMP. The AMPGHV map is set so the third map value AMPGHV increases with an increase in the engine rotational speed NE and with an increase in the absolute intake pressure PBA.

In step S123, the gain coefficient GAMP is set to the third map value AMPGHV calculated in step S122.

If FVTEC is equal to "0" in step S121, which indicates that low-speed valve timing is selected, steps S31 to S35 are executed to calculate the gain coefficient GAMP according to an operating condition of the cylinder halting mechanism 30A.

Referring back to FIG. 17, in step S103, the KAGTW calculation process shown in FIG. 12 is executed to calculate the correction coefficient KAGTW.

In step S104, it is determined whether the engine rotational speed NE is higher than a gain switching speed NEKIRI, e.g., 2500 rpm. If NE is greater than NEKIRI, which indicates the engine 1 is operated at a high speed, a control signal for selecting a low gain as a gain of the gain switching circuit 62 is output (step S105), and a gain switching coefficient KAGKIRI is set to a high-speed predetermined value KAGKIRIH (step S106). Conversely, if NE is less than or equal to NEKIRI in step S104, a control signal for selecting a high gain as the gain of the gain switching circuit 62 is output (step S107), and the gain switching coefficient KAGKIRI is set to a low-speed predetermined value KAGKIRIL (step S108). The low-speed predetermined value KAGKIRIL is set to a value greater than the high-speed predetermined value KAGKIRIH.

In step S109, the determination threshold KLVL is calculated from Eq. (6) shown below.

$$KLVL=NZMINAA \times GAMP \times KAGTW \times KAGKIRI \quad (6)$$

In step S110, it is determined whether the maximum value KSMAX of the knock level is greater than the determination threshold KLVL. If KSMAX is greater than KLVL, it is determined that knocking has occurred, and the knocking flag FKNOCK is set to "1" (step S111). If KSMAX is less than or equal to KLVL, it is determined that no knocking has occurred, and the knocking flag FKNOCK is set to "0" (step S112).

The main microcomputer 53 corrects the ignition timing according to the result of the knocking determination, that is, according to the value of the knocking flag FKNOCK, and controls the ignition timing within the range where no knocking occurs, so the engine output is maximized.

Also in this embodiment, the gain coefficient GAMP is set similarly to the first embodiment when selecting the low-speed valve timing, so that a proper determination threshold KLVL is obtained and accurate knocking determination is performed, both during partial-cylinder and all-cylinder operations.

In this embodiment, the rectification and detection circuit 64, the sub-microcomputer 52, and the main microcomputer 53 form the determination threshold setting means. The gain switching circuit 62, the rectification and detection circuit 63, the sub-microcomputer 52, and the main microcomputer 53 form the knocking determination means. The main microcomputer 53 also forms the control means.

Figure 19:
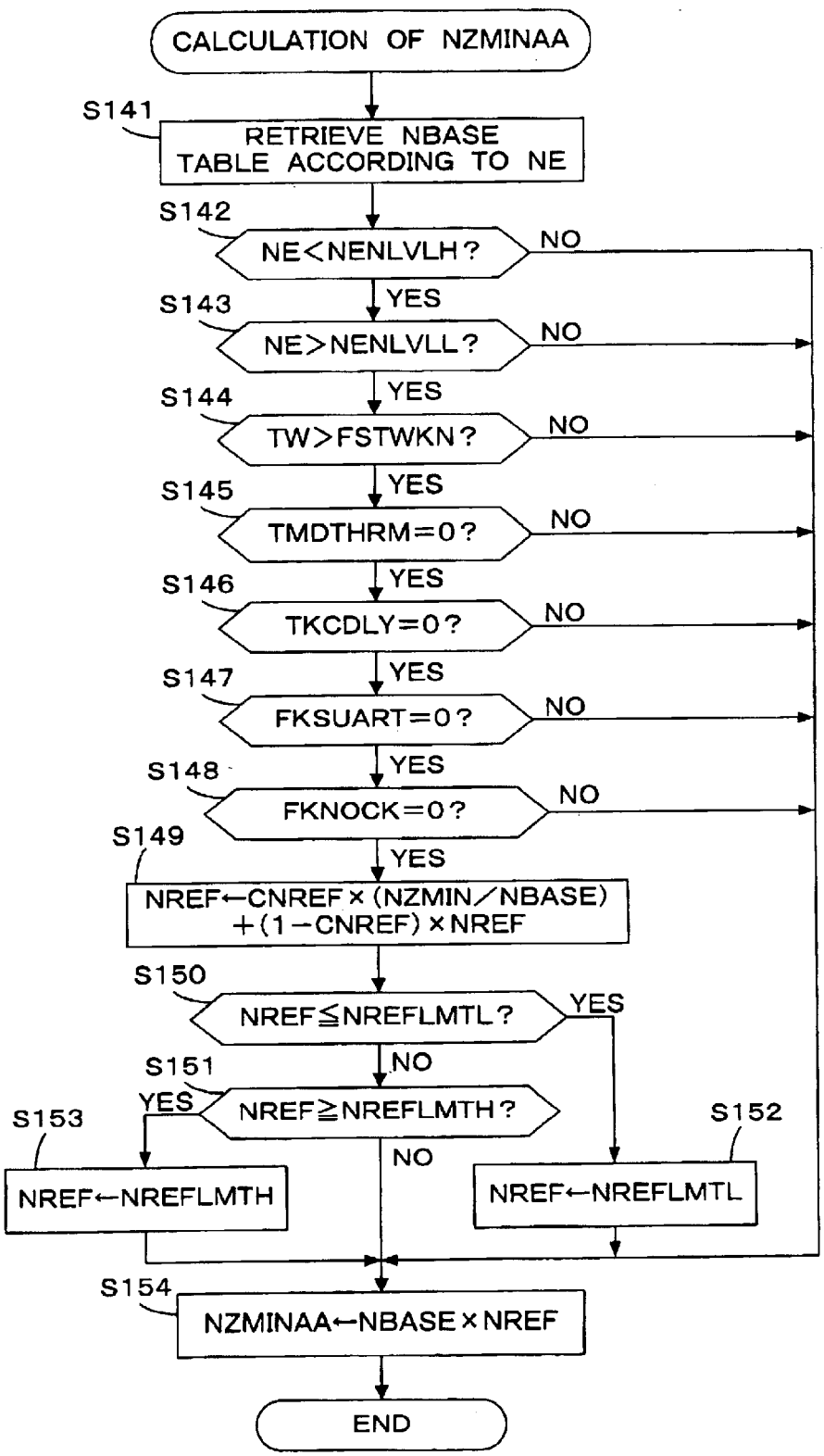
FIG. 19 is a flowchart of a noise level calculation process according to a modification of the third embodiment.

FIG. 19 is a flowchart showing a modification of the noise level NZMINAA calculation process of the third embodiment. In the modified noise level NZMINAA calculation process, a learning value NREF for a ratio (NZMIN/NBASE) of a minimum value NZMIN of the detected noise level and a basic value NBASE of the noise level calculated according to the engine rotational speed NE, is calculated, and the basic value NBASE is multiplied by the learning value NREF to calculate the noise level NZMINAA. Execution of the modified noise level NZMINM calculation process of FIG. 19 is synchronized with generation of a TDC pulse.

Figure 20:
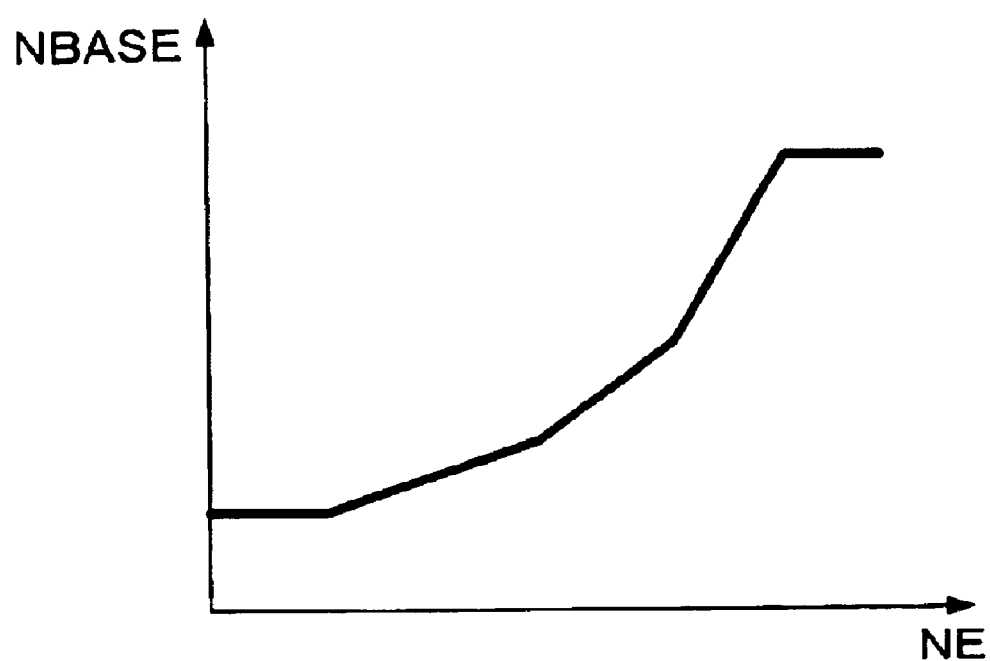
FIG. 20 is a graph showing a table used in the noise level calculation process of FIG. 19.

In step S141, an NBASE table shown in FIG. 20 is retrieved according to the engine rotational speed NE to calculate the basic value NBASE of the noise level. The NBASE table is set so the basic value NBASE increases with an increase in the engine rotational speed NE.

In step S142, it is determined whether the engine rotational speed NE is lower than a predetermined upper limit NENLVLH, e.g., 4500 rpm. If the answer to step S142 is affirmative, i.e., YES, it is determined whether the engine rotational speed NE is higher than a predetermined lower limit NENLVLL, e.g., 3000 rpm (step S143). If the answer to step S143 is affirmative, i.e., YES, it is determined whether the engine coolant temperature TW is higher than a predetermined temperature FSTWKN, e.g., 60 degrees Centigrade (step S144).

If the answer to step S144 is affirmative, i.e., YES, it is determined whether the value of a downcount timer TMDTHRM is "0" (step S145). The downcount timer TMDTHRM is set to a predetermined time period, e.g., 1.5 sec, when the vehicle speed is less than or equal to 30 km/h. If TMDTHRM is equal to "0", it is determined whether the value of a downcount timer TKCDLY is "0" (step S146). The downcount timer TKCDLY is set to a predetermined time period, e.g., 0.3 sec, when the valve timing is switched. If the answer to step S146 is affirmative, i.e., YES, it is determined whether a communication abnormality flag FKSUART is "0" (step S147). The communication abnormality flag FKSUART is set to "1" when an abnormality is detected in the communication between the sub-microcomputer 52 and the main microcomputer 53. If FKSUART is equal to "0", it is determined whether the knocking flag FKNOCK is "0" (step S148).

If the answer to any one of steps S142 to S148 is negative, i.e., NO, the learning value NREF is not updated, and the program proceeds directly to step S154. If the answers to all of the steps S142 to S148 are affirmative, i.e., YES, it is determined that the learning condition has been satisfied, and the latest minimum value NZMIN and the latest basic value NBASE are applied to Eq. (7) shown below to update the learning value NREF.

$$NREF=CNREF\times(NZMIN/NBASE)+(1-CNREF)\times NREF \quad (7)$$

where CN REF is an averaging coefficient set to a value between "0" and "1", and NREF on the right side is a preceding calculated value.

In steps S150 to S153, a limit process of the learning value NREF is performed. More specifically, it is determined whether the learning value NREF is less than or equal to a predetermined lower limit NREFLMTL (step S150). If NREF is less than or equal to NREFLMTL, the learning value NREF is set to the predetermined lower limit NREFLMTL (step S152). If NREF is greater than NREFLMTL, it is determined whether the learning value NREF is greater than or equal to a predetermined upper limit NREFLMTH (step S151). If NREF is greater than or equal to NREFLMTH, the learning value NREF is set to the predetermined upper limit NREFLMTH (step S153). If NREF is greater than NREFLMTL and less than NREFLMTH, the program proceeds directly to step S154.

In step S154, the basic value NBASE and the learning value NREF are applied to Eq. (8) shown below to calculate the noise level NZMINAA.

$$NZMINAA=NBASE\times NREF \quad (8)$$

By applying the noise level NZMINAA thus calculated to Eq. (6) mentioned above, the determination threshold KLVL is calculated and the calculated KLVL is used for knocking determination.

Further, it should be noted that the present invention is applicable also to the control of a watercraft propulsion engine, such as, for example only, an outboard motor having a vertically extending crankshaft.

The present invention may be embodied in other specific forms without departing from the spirit or essential characteristics thereof. The disclosed embodiments herein are therefore to be considered in all respects as illustrative and not restrictive, and all modifications thereof are to be embraced therein.

What is claimed is:

1. A knock control system for an internal combustion engine having a plurality of cylinders, operation of said engine being switchable between a partial-cylinder operation for operating some of said cylinders and an all-cylinder operation for operating all of said cylinders, the system comprising:

a knock sensor mounted on said engine;

determination threshold setting means for setting a determination threshold to determine knocking according to an output signal from said knock sensor;

knocking determination means for comparing a level of the output signal from said knock sensor with the determination threshold, and for determining occurrence of knocking according to a result of the comparison; and control means for controlling at least one operating parameter of said engine according to a result of the determination by said knocking determination means, wherein said determination threshold setting means sets the determination threshold used during the partial-cylinder operation to a value which is less than a value of the determination threshold used during the all-cylinder operation.

2. The knock control system according to claim 1, wherein said determination threshold setting means calculates the determination threshold by multiplying a noise level detected during a noise gate period by a gain coefficient.

3. The knock control system according to claim 2, wherein the gain coefficient is set according to a rotational speed of said engine, a load on said engine, and a number of said cylinders being operated.

4. The knock control system according to claim 3, wherein the gain coefficient is corrected according to an estimated octane of fuel in use.

5. The knock control system according to claim 3, wherein the gain coefficient is corrected according to a temperature of said engine.

6. A knock control method for an internal combustion engine having a plurality of cylinders, operation of said engine being switchable between a partial-cylinder operation for operating some of said cylinders and an all-cylinder operation for operating all of said cylinders, the method comprising the steps of:

a) setting a determination threshold for determining knocking according to an output signal from a knock sensor mounted on said engine;

b) comparing a level of the output signal from said knock sensor with the determination threshold;

c) determining occurrence of knocking according to a result of the comparison; and d) controlling at least one operating parameter of said engine according to a result of the determination;

wherein said determination threshold used during the partial-cylinder operation is set to a value less than a value of the determination threshold used during the all-cylinder operation.

7. The knock control method according to claim 6, wherein the determination threshold is calculated by multiplying a noise level detected during a noise gate period by a gain coefficient.

8. The knock control method according to claim 7, wherein the gain coefficient is set according to a rotational speed of said engine, a load on said engine, and a number of said cylinders being operated.

9. The knock control method according to claim 8, wherein the gain coefficient is corrected according to an estimated octane of fuel in use.

10. The knock control method according to claim 8, wherein the gain coefficient is corrected according to a temperature of said engine.

11. A computer-readable medium encoded with a computer program for causing a computer to carry out a knock control method for an internal combustion engine having a plurality of cylinders, operation of said engine being switchable between a partial-cylinder operation for operating some of said cylinders and an all-cylinder operation for operating all of said cylinders, the method comprising the steps of:

a) setting a determination threshold for determining knocking according to an output signal from a knock sensor mounted on said engine;

b) comparing a level of the output signal from said knock sensor with the determination threshold;

c) determining occurrence of knocking according to a result of the comparison; and d) controlling at least one operating parameter of said engine according to a result of the determination;

wherein said determination threshold used during the partial-cylinder operation is set to a value less than a value of the determination threshold used during the all-cylinder operation.

12. The computer-readable medium encoded with a computer program according to claim 11, wherein the determination threshold is calculated by multiplying a noise level detected during a noise gate period by a gain coefficient.

13. The computer-readable medium encoded with a computer program according to claim 12, wherein the gain coefficient is set according to a rotational speed of said engine, a load on said engine, and a number of said cylinders being operated.

14. The computer-readable medium encoded with a computer program according to claim 13, wherein the gain coefficient is corrected according to an estimated octane of fuel in use.

15. The computer-readable medium encoded with a computer program according to claim 13, wherein the gain coefficient is corrected according to a temperature of said engine.

* * * * *